No. 869,244. PATENTED OCT. 29, 1907.
A. S. HUBBARD.
ALTERNATING CURRENT APPARATUS.
APPLICATION FILED JULY 2, 1906.
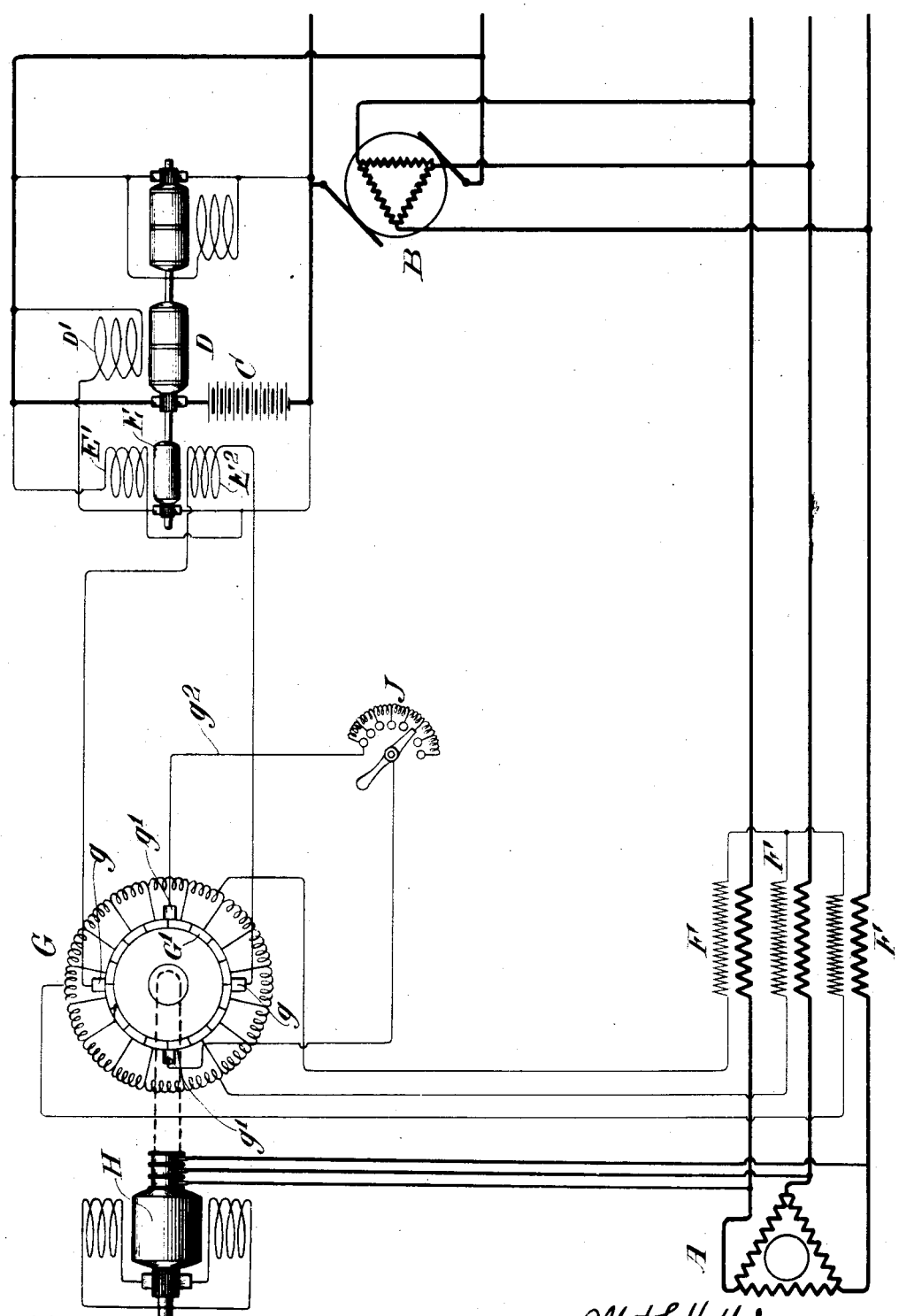

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ALTERNATING-CURRENT APPARATUS.

No. 869,244.　　　Specification of Letters Patent.　　　Patented Oct. 29, 1907.

Application filed July 2, 1906. Serial No. 324,393.

*To all whom it may concern:*

Be it known that I, ALBERT S. HUBBARD, a citizen of the United States, and a resident of Belleville, Essex county, State of New Jersey, have invented certain new and useful Improvements in Alternating-Current Apparatus, of which the following is a specification.

My invention relates to electrical systems of distribution of the alternating current type and comprises means especially adapted for the automatic regulation of such systems. I have devised the various features of my invention with specific reference to the regulation of a storage battery used in connection with an alternating current system to steady the load on the alternating current generator, but the specific means that I have devised to carry out my method are applicable to other types of systems.

As is well known, in all alternating current systems having in whole or in part inductive or capacity load there occur changes of power factor in the system, that is, the phase relation of the voltage and the current changes. With such change of power factor the true energy or load upon the system bears a different relation to the product of the voltage and current because a certain amount of apparent energy is what has been termed "wattless current".

My invention involves the production of a current that varies with the current or voltage changes of the circuit but which is so modified by changes of power factor as to correspond to the true energy of the system rather than to the apparent energy thereof. It involves further the employment of such a current for purposes of regulation, including the regulation of the field of a dynamo, in accordance with a varying current of this character. It also involves the regulation of a regulating battery for an alternating current system by a varying current of this character; or, broadly, the varying of the battery current in accord with the changes of a component of the true energy as distinguished from a component of the apparent energy. Preferably, this current I produce is varied in accordance with current changes of the alternating current system as modified by the power faction changes. My invention more specifically involves the production of such a current as I have specified by by-passing from the circuit to which such current is to be supplied a current that varies when the power factor changes, the current in the bypass or local circuit being preferably zero as long as the power factor is unity so that whenever there is a leading or lagging current there is a current in the by-pass circuit.

The specific apparatus constituting another feature of my invention comprises a rectifier of the induction type, having sets of commutator-brushes electrically displaced from each other, one of said sets being preferably placed at the points having a zero difference of potential when the power factor is unity, whereas the other set of brushes is preferably placed at points where the difference of potential is maximum when the power factor is unity. The two sets of brushes are connected to different circuits. I have shown this rectifier supplied with current from the alternating current circuit, which current is provided by transformers in series with the alternating current generator, and the rectifier current is employed for regulating the battery current, a direct current regulating coil for the battery being connected to the brushes having normally maximum potential, while a local circuit containing a resistance is connected to the brushes having normally zero potential. In this way as long as the power factor remains unity the current from the series transformers and the current given out to the direct current regulating coil are in exact proportion, but when the power factor departs from unity the field of the rectifier is shifted relatively to the brushes causing the brushes, no longer to be respectively at the points of maximum and zero potential. If the extra set of brushes and the local circuit were not provided the voltage across the series transformers would rise until the voltage across the commutator brushes and the rectifier would rise sufficiently to produce a current in the regulating circuit corresponding to the change of current in the series transformers. In other words, even though the brushes connected to the regulating circuit are no longer at the points of maximum potential, the transformation from the alternating current to the direct current side would still remain a true current transformation. As, however, the field of the rectifier shifts, the brushes normally at zero potential become subjected to a potential difference which will cause a current to flow in the local or by pass circuit, thus diverting current from the regulating circuit and making it unnecessary, if the parts are properly adjusted, for the voltage across the series transformers to rise. The result is therefore that the current in the regulating circuit is a resultant of the current in the alternating current circuit and the power factor of that circuit.

Although I have thus described this rectifier device and the circuits and apparatus to which it is thus connected somewhat specifically, it will be understood that my apparatus and invention is not, in its broadest phase, limited to all the various features I have described, as I believe it to be broadly new to employ the pair of brushes connected at points of normally zero difference of potential and that this feature may be used for various purposes. More specifically, however, my invention involves various combinations of this feature to give the more specific advantages resulting from the combination of elements above referred to.

The drawing accompanying this specification is a diagram which illustrates a system constituting a specific embodiment of my invention. In this diagram A indicates an alternating current generator of any type it being understood that there may be any number of generators and that the generator or generators may be rotary converters located at sub-stations if desired. B indicates any suitable form of rectifying device, as, for example, a rotary converter, the current to which is supplied by the generator A, while the direct current supply is connected to a battery C preferably having a booster D in series with it. ork circuits may be connected either to the alternating current side or the direct current side of the rotary converter E, or there may be a direct current work circuit on one side of the rotary converter and an alternating current work circuit on the other side thereof.

As so far described the system is merely one in which a regulating storage battery and booster are employed to steady the load on a main alternating current generator. In such systems it is most usual to so regulate the system that with a given current load on the main generators the booster voltage will be zero and the battery will float across the direct current side of the system neither charging nor discharging. Upon increase of current on the main generator a booster voltage is developed in one direction causing or assisting the battery to discharge and limiting the change of generator current. Upon a decrease of generator current below the predetermined average a booster voltage is developed in the opposite direction causing the battery to charge and thus limiting the reduction of the current on the main generator.

The booster voltage is controlled by a suitable regulating apparatus from coils in the alternating current circuit. In the present instance the booster field winding D′ is connected in series with a regulating dynamo or counter machine E and the regulation of the booster voltage is effected by varying the field strength of this counter machine. This counter machine is illustrated as having two windings, a substantially constant current winding E′ connected across the direct current side of the system and a regulating winding $E^2$ which is governed by changes in the alternating current circuit. In order that the changes in the alternating current circuit may act upon the coils $E^2$ I have provided transformers F whose primaries are in series with the generator A and whose secondaries are connected to the distributed windings on a rectifier of the induction type which is diagrammatically indicated at G. This rectifier is preferably devoid of motor action and is so illustrated. Some outside means must therefore be provided to drive the rectifier synchronously. In the present instance this is accomplished by the synchronous motor H driven from the alternating current circuit. This motor drives the rectifier so that it rotates synchronously with the voltage of the generator A. The regulating field coil $E^2$ is connected to brushes $g$ bearing on the commutator G′ of the rectifier. These brushes are preferably placed in the usual position for such brushes, namely, at the points of normal maximum voltage. This rectifier placed in the regulating circuit and employed to provide current to the regulating coil of the direct current side of the system is more fully described together with its incumbent advantages in an application of Edward Van Wagenen filed on even date herewith. When used with polyphase currents as illustrated in the diagram, a rotating field is produced and the rectifier is driven in a direction opposite to that of the rotation of said field so that the brushes $g$ are always maintained at the points of maximum potential assuming that the power factor of the alternating current circuit is unity.

Assuming that the power factor of the alternating current circuit is at unity and does not change then the operation of the apparatus as so far described is as follows: Upon any change of current on the generator A a corresponding change takes place in the transformers F, an exactly proportionate change takes place in the circuit of the regulating coil $E^2$ and the counter machine voltage and therefore the battery voltage are properly governed in direct accordance with changes of the current in the main generator. Because the rectifier is devoid of motor action no inaccuracy is introduced due to any tendency of the rectifier to propel the synchronous motor, which tendency would divert current from the circuit of the coil $E^2$. Such regulation of the booster in accordance with changes of current on the generator A has frequently been referred to as a regulation by changes of load on the generator A. Such regulation, however, applied to most commercial plants would in no way be either a true load regulation or even such a current regulation as would bear any reasonable relation to load changes. This is due to the character of changes of power factor that occur in such systems. Heretofore it has been assumed that the power factor would bear such relation to the current flowing that a regulation in accordance with current changes would also properly compensate for changes of power factor and the wattless currents caused by such changes. I have found that this is very far from being a proper assumption to make. The wattless energy does not necessarily bear any definite relation to the amount of current supplied by the generator and in any case no satisfactory load regulation for an alternating current generator can be obtained if the attempt is made to regulate directly in accordance with changes of current. In accordance with my improved method I regulate by a current that has a value corresponding to a resultant of the value of the current on the main generator and that of the wattless energy or power factor. To accomplish this in the specific embodiment illustrated I have shunted or by-passed current from the regulating circuit whenever the power factor departs from unity, varying the amount of such by-passed currents in accordance with changes of power factor. The special apparatus which I have devised and which forms part of my invention comprises specifically a pair of brushes $g'$ which are displaced about ninety electrical degrees from the brushes $g$ so that they bear upon the commutator G′ at points having a zero difference of potential when the power factor of the circuit is unity. Connected to these brushes $g'$ is a local circuit $G^2$ in which is placed an adjustable resistance J by which the apparatus may be adjusted for the most advantageous regulation.

When there is unity power factor on the circuit the current in the circuit $G^2$ will be zero. When, however, the power factor departs from unity setting up wattless currents, the brushes $g$ and $g'$ become displaced with reference to the polar line of the rectifier G since that polar line is dependent upon the phase of the current, whereas the rectifier is rotated in synchronism with the voltage. The change of power factor that throws the voltage and current waves out of phase thus causes the brushes $g$ and $g'$ to become displaced from the points of maximum and zero difference of potential. If there were no brushes $g'$, the voltage across the primaries of transformers F would necessarily rise when this displacing occurs because these transformers are series transformers and must develop in their secondaries a current proportionate to that in their primaries and for the same reason, the rectifier G must give out to the circuit $E^2$ a current proportionate to that which it receives. The displacing of the brushes $g'$, however, causes a substantial difference of potential to be developed between them and so causes a current to be by-passed into the local circuit $G^2$. By proper adjustment of the circuit the voltage across the primaries or transformers F may be kept at all times proportional to the current therein, whereby changes of power factor reducing the voltage across brushes $g$ will also reduce the current in the regulating coil $E^2$.

By my invention, therefore, I am enabled to produce a current in $E^2$ that varies in accordance with changes of current of transformers F only when there is no change of power factor. If, however, there is a coincident change of current and change of power factor, the voltage in the coil $E^2$ will be a resultant of these changes, an increase of current in the alternating current circuit tending to increase the current in the coil $E^2$, while a decrease of power factor tends to decrease it. In this way the regulation is not affected by the wattless current component of the apparent energy.

It is obvious that the principle of my invention as herein described may be applied to many different specific systems either where voltage or where current regulation is the dominating regulation. In the present case the current regulation is the dominating regulation. Strictly speaking the regulation illustrated and described is not a load regulation because it is a regulation that is independent of voltage changes. It is, however, a regulation that, broadly speaking, is a load regulation in the same sense that a regulation by current changes of a direct current circuit is frequently denominated a load regulation. It should also be noted that the specific apparatus employed to by-pass some of the regulating current in accordance with changes of power factor is applicable to a number of purposes. Indeed, the circuit $G^2$ might be used without the regulating circuit connected to the brushes $g$ as a means of indication or regulation.

Having thus described my invention, what I claim as new and desire to protect by Letters Patent is:—

1. The combination of an alternating current generator, a regulating battery therefor, regulating apparatus for varying the battery action and means for controlling the action of said apparatus in accordance with the resultant of the values of the current of the alternating current circuit and the power factor thereof.

2. The combination of an alternating current generator, a regulating battery therefor regulating apparatus for varying the battery action, means for supplying a regulating current to said apparatus, and means for changing the ratio between the regulating current and that of the alternating current generator in accordance with changes of power factor of the alternating current circuit.

3. The combination of an alternating current generator, a regulating battery therefor, regulating apparatus for varying the battery action, means for regulating said apparatus responsively to variations of one of the components of the alternating current energy, and means for oppositely regulating said apparatus in accordance with the wattless current of the alternating current circuit.

4. The combination of an alternating current generator, a regulating battery therefor, regulating apparatus for varying the battery action, means for supplying a regulating current to said apparatus, and means for by-passing current from said regulating apparatus in accordance with changes of power factor of the alternating current circuit.

5. The combination with an alternating current circuit, a regulating apparatus, a regulating circuit therefor, and means for by-passing current from said circuit in accordance with changes of power factor of the alternating current circuit.

6. The combination with an alternating current circuit of a compensatory storage apparatus in operative relation therewith, regulating apparatus for said storage apparatus connected to the alternating current circuit, and means for affecting the action of said regulating apparatus by power factor changes of the alternating current circuit.

7. The combination of an alternating current generator, compensatory storage apparatus in operative relation thereto, and means for affecting the action of the storage apparatus responsively to power factor changes of the system.

8. An alternating current generator, a compensatory storage battery, regulating devices therefor, apparatus connected to the circuit of the alternating current generator for determining the current for controlling the regulating devices, and means for causing out-of-phase relations of the electro-motive-force and current of the alternating current circuit to act upon said apparatus to modify said current.

9. The combination of an alternating current generator, its load and a regulating batery therefor, regulating apparatus for varying the battery action and means for controlling the action of said regulating apparatus, one of the factors of said control being the power factor of the alternating current circuit.

10. A rectifying device of the induction type having a pair of brushes engaging commutator segments having practically zero difference of potential and a circuit connecting said brushes.

11. A rectifying device of the induction type, having two sets of brushes engaging commutator segments displaced substantially ninety electrical degrees.

12. A rectifying device of the induction type having a pair of brushes adjusted to engage commutator segments having practically zero potential when the power factor is unity.

13. A rectifying device of the induction type having two sets of brushes adjusted to engage the commutator at points corresponding respectively to maximum and zero differences of potential when the power factor is unity.

14. A rectifying device of the induction type, a regulating circuit in connection with the usual commutator brushes thereof, a set of commutator brushes electrically displaced with relation to the usual brushes, and a circuit connected to said displaced brushes.

15. A rectifying device of the induction type, a regulating circuit in connection with the usual commutator brushes thereof, a set of commutator brushes displaced substantially ninety electrical degrees with relation to the usual brushes, and a circuit connected to said displaced brushes.

16. A rectifying device having induction but devoid of motor action, having in adition to the usual commutator brushes, a set of brushes engaging the commutator to receive substantially zero potential when the power factor is unity.

17. A rectifying device having induction but devoid of motor action, a direct current regulating circuit fed from brushes bearing on the commutator thereof, a second circuit, and an additional pair of commutator brushes feeding the same.

18. A rectifying device having induction but devoid of motor action, a direct curent regulating circuit fed from brushes bearing on the commutator thereof, a set of commutator brushes displaced substantially ninety electrical degrees relatively to the usual commutator brushes, and a second circuit connected thereto.

19. A rectifying device having induction but devoid of motor action, a direct current regulating circuit fed from brushes bearing on the commutator thereof, a set of commutator brushes displaced substantially ninety electrical degrees relatively to the usual commutator brushes, a second circuit connected thereto, and means for adjusting the resistance of said second circuit.

20. The combination with a rectifier in a regulating circuit of means for diverting current therefrom when there is a departure from a predetermined power factor.

21. The combination with a rectifier in a regulating circuit of a local direct current circuit, and means for diverting current from the rectifier to said local circuit when there is a departure from a predetermined power factor.

22. The combination of a regulating circuit, a rectifier of the induction type supplying the current thereto, a local circuit, and means for supplying current thereto in accordance with changes of power factor.

23. The combination of a regulating circuit, a rectifier of the induction type supplying the current thereto, a local circuit, means for supplying current thereto in accordance with changes of power factor, and means for adjusting the resistance of the local circuit.

24. The combination of an alternating current circuit, series transformers therein, a rectifying device of the induction type supplied from said series transformers, a direct current regulating circuit supplied from the rectifying device, and means for diverting current from said rectifying device when the power factor departs from a predetermined value.

25. The combination of an alternating current circuit, series transformers therein, a rectifying device of the induction type supplied from the series transformers, two sets of electrically displaced commutator brushes for said rectifier, a regulating circuit connected to one set of brushes, and a second circuit connected to the other brushes.

26. The combination of an alternating current circuit, series transformers therein, a rectifying device of the induction type supplied from the series transformers, two sets of electrically displaced commutator brushes for said rectifier, a regulating circuit connected to one set of brushes, a second circuit connected to the other brushes and means for adjusting the resistance of said second circuit.

27. The combination of an alternating current circuit, series transformers therein, a rectifying device of the induction type supplied from said series transformers, a direct current regulating circuit supplied from the rectifying device, and means for modifying the relation between the transformer current and that of the regulating circuit as the power factor changes.

28. The combination of an alternating current circuit, series transformers therein, a rectifying device of the induction type supplied from said series transformers, brushes engaging the rectifier commutator at points of normal maximum difference of potential, a regulating circuit connected to said brushes, brushes engaging said commutator at points of normal minimum difference of potential, and a circuit connected to the latter brushes.

29. The combination of an alternating current circuit, series transformers therein, a rectifying device of the induction type supplied from said series transformers, brushes engaging the rectifier commutator at points of normal maximum difference of potential, a regulating circuit connected to said brushes, brushes engaging said commutator at points of normal minimum difference of potential, and a circuit connected to the latter brushes.

30. The combination of an alternating current circuit, a rectifying device supplied therefrom, a dynamo, a controlling coil therefor fed from said rectifying device, and means for varying the current supplied to said coil according to power factor changes in the alternating current circuit.

31. The combination of an alternating current circuit, a rectifying device supplied therefrom, a dynamo, a controlling coil therefor fed from said rectifying device, and means for diverting current from the rectifier according to changes of power factor of the alternating current circuit.

32. The combination of an alternating current circuit, a rectifying device of the induction type supplied therefrom, a dynamo, a controlling coil therefor fed from brushes bearing on the rectifier commutator, a second set of commutator brushes electrically displaced with relation to the usual brushes, and a local circuit connected to said second set of brushes.

33. The combination of an alternating current circuit, series transformers therein, a rectifying device of the induction type supplied therefrom, a dynamo, a controlling coil therefor fed from brushes bearing on the rectifier commutator, a second set of commutator brushes electrically displaced with relation to the usual brushes, and a local circuit connected to said second set of brushes.

34. The combination of an alternating current circuit, series transformers therein, a rectifying device supplied therefrom, a dynamo, a controlling coil therefor fed from brushes bearing on the rectifier commutator, and means for varying the ratio between the current of the series transformers and that of the controlling coil according to changes of power factor of the alternating current circuit.

35. The combination of an alternating current generator, a rectifying device connected thereto, a storage battery also connected thereto, regulating apparatus for varying the battery action, a controlling coil therefor, a rectifying device supplying current to said controlling coil and connected to the alternating current generator, and means for varying the current in said coil according to changes of power factor in the alternating current circuit.

36. The combination of an alternating current generator, a rectifying device connected thereto, a storage battery also connected thereto, regulating apparatus for varying the battery action, a controlling coil therefor, transformers in series with the alternating current generator, a rectifying device connected thereto, connections from the rectifying device to said controlling coil, and means for varying the ratio between the said transformer current and that in the controlling coil according to changes of power factor of the alternating current circuit.

37. The combination of an alternating current generator, a rectifying device connected thereto, a storage battery also connected thereto, regulating apparatus for varying the battery action, a controlling coil therefor, transformers in series with the alternating current generator, a rectifying device connected thereto, connections from the rectifying device to said controlling coil, and means for diverting current from said rectifying device as the power factor of the alternating current circuit changes.

38. The combination of an alternating current generator, a rectifying device connected thereto, a storage battery also connected thereto, regulating apparatus for varying the battery action, a controlling coil therefrom, a rectifier of the induction type connected to the alternating current generator, a local circuit, two sets of brushes bearing on the rectifier commutator, one set electrically displaced with reference to the other, and connections from one set of brushes to the controlling coil and from the other set to a local circuit.

39. The combination of an alternating current generator, a rectifying device connected thereto, a storage battery also connected thereto, regulating apparatus for varying the battery action, a controlling coil therefor, a rectifier of the induction type connected to the alternating current generator, a local circuit, two sets of brushes bearing on the rectifier commutator, one set electrically displaced with reference to the other, connections from one set of brushes to the controlling coil and from the other set to a local circuit, and means for adjusting the resistance of said local circuit.

40. The combination of an alternating current generator, a rectifying device connected thereto, a storage battery also connected thereto, regulating apparatus for varying the battery action, a controlling coil therefor, a rectifier of the induction type connected to the alternating current generator, a set of brushes bearing on the rectifier commutator and connected to said controlling coil, a local circuit, and a set of brushes connected to said local circuit and engaging the commutator at points of substantially zero difference of potential when the power factor of the alternating current circuit is unity.

41. The combination of an alternating current generator, a rectifying device connected thereto, a storage battery also connected thereto, regulating apparatus for varying the battery action, a controlling coil therefor, series transformers therein, a rectifying device connected to said transformers, a set of brushes bearing on the rectifier commutator and connected to said controlling coil, a local circuit, and a set of brushes connected thereto and engaging the commutator at points of substantially zero difference of potential when the power factor of the alternating current circuit is unity.

42. The combination of an alternating current generator, a rectifying device connected thereto, a storage battery also connected thereto, regulating apparatus for varying the battery action, a controlling coil therefor, series transformers therein, a rectifying device connected to said transformers, a set of brushes bearing on the rectifier commutator and connected to said controlling coil, a local circuit, a set of brushes connected thereto and engaging the commutator at points of substantially zero difference of potential when the power factor of the alternating current circuit is unity, and means for adjusting the resistance of the local circuit.

43. A rectifying device of the induction type and means for driving it in synchronism with one of the factors of an alternating load, a commutator and collector rings for the rectifier, means to electrically connect the collector rings and the alternating circuit, means for interlinking the fields due to the alternating and direct currents, and two sets of brushes for the commutator, one set displaced practically ninety electrical degrees relatively to the other set.

44. A rectifying device of the induction type and means for driving it in synchronism with one of the factors of an alternating load, a commutator and collector rings for the rectifier, means to electrically connect the collector rings and the alternating circuit, means for interlinking the fields due to the alternating and direct currents, and two sets of brushes for the commutator, one set electrically displaced relatively to the other set and means for utilizing the current from one set of brushes.

45. A rectifying device of the induction type and means for driving it in synchronism with one of the factors of an alternating load, a commutator and collector rings for the rectifier, means to electrically connect the collector rings and the alternating circuit, means for interlinking the fields due to the alternating and direct currents, and two sets of brushes for the commutator, one set electrically displaced relatively to the other set, the current from one set being utilized, the other set by-passing current from the first set when the driving power is out of phase with the alternating current to be rectified.

46. A rectifying device of the induction type and means for driving it in synchronism with one of the factors of an alternating load, a commutator and collector rings for the rectifier, means to electrically connect the collector rings and the alternating circuit, means for interlinking the fields due to the alternating and direct currents, and two sets of brushes for the commutator, one set electrically displaced relatively to the other set, and means for obtaining an alternating current to be rectified, varying as the factor to be measured.

47. A device for producing a current corresponding to power factor changes comprising a rectifying device having two sets of commutator brushes, the current dividing between the two sets according to the power factor.

48. A rectifying device of the induction type for polyphase currents and means for driving it in synchronism with one of the factors of an alternating load, a commutator and collector rings for the rectifier, means to electrically connect the collector rings to the different phases of the alternating circuit, means for interlinking the fields due to the alternating and direct currents, and two sets of brushes for the commutator, one set electrically displaced relatively to the other set.

49. An alternating current circuit, a regulating storage battery, a controlling apparatus for the battery, and means for acting upon said controlling apparatus in accordance with variations in the apparent load of the alternating current circuit as modified by the power factor changes therein.

In testimony whereof, I have signed my name to this specification, in the presence of two subscribing witnesses.

ALBERT S. HUBBARD.

Witnesses:
EDWIN SEGER,
ANNA DALY.

---

It is hereby certified that in Letters Patent No. 869,244, granted October 29, 1907, upon the application of Albert S. Hubbard, of Belleville, New Jersey, for an improvement in "Alternating-Current Apparatus," an error appears in the printed specification requiring correction, as follows: In line 43, page 1, the word "faction" should read *factor*; and that the said Letters Patent should be read with this correction therein that the same may conform to the record of the case in the Patent Office.

Signed and sealed this 17th day of December, A. D., 1907.

[SEAL.]

C. C. BILLINGS,
*Acting Commissioner of Patents.*